United States Patent Office 2,875,606
Patented Mar. 3, 1959

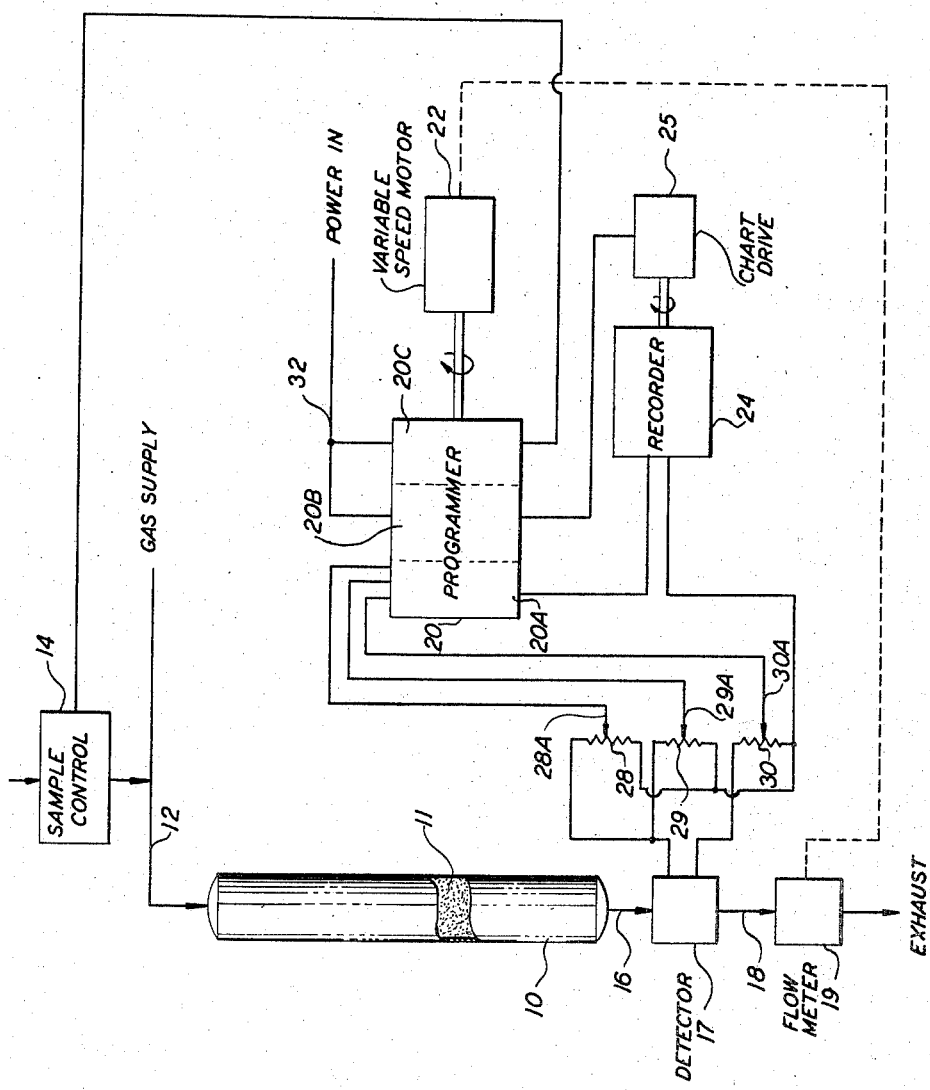

2,875,606

CHROMATOGRAPHY

Charles F. Robinson, Pasadena, Calif., assignor to Consolidated Electrodynamics Corporation, Pasadena, Calif., a corporation of California Application February 20, 1956, Serial No. 566,611

6 Claims. (Cl. 73—23)

This invention relates to improvements in chromatography and in chromatographic apparatus facilitating the use of this analytical technique to process monitoring applications.

"Adsorption chromatography" is a term which may properly be applied to liquid or gas phase chromatography. In adsorption chromatography a column containing appropriate adsorbent, usually in granular form, is used to separate the various components of a fluid sample, the term "fluid" being used to designate either gases or liquids. The sample, if liquid, is percolated through the column by continued introduction of the sample material, by washing with a pure solvent, or by washing with a solution of substances more strongly adsorbed than the components of interest of the sample. In gas phase a sample is generally introduced to the column in a carrier gas stream. Under proper conditions, various components of the fluid sample are spatially separated by the process of selective adsorption and desorption, closely analogous to the mechanism of fractional distillation, so that the constituents are stratified in the column and a continued displacement causes selectice ejection of the constituents from the column in a sequential order. This order is a function of the relative volatility, molecular weight or other property affecting the degree of adsorption of the fluid constituents on the adsorbent in the column. Conventionally, as the separated materials emerge, they are suitably detected through the sensing of characteristic properties such as thermal conductivity, density, refractive indices and the like to indicate and identify the amount of the several components thereof.

Another form of chromatography is gas-liquid partition chromatography, the essential feature of which is the provision in the chromatographic column of an extensive liquid surface over which a gas sample is caused to flow. Normally, this is accomplished by disposing the desired liquid in static condition as a very thin film over the large exposed surface of an inert support. When a gas sample is passed through a column of this type in company with a suitable elutant or carrier gas, the continuous solution and evaporation which takes place along the column makes it again, in effect, analogous to a fractionating operation in which the lighter components of the gas sample appear at the column outlet in advance of the heavier components. It is also conventional in gas-liquid partition chromatography to pass the gaseous effluent from the column through a suitable detector to sense the identity and quantity of the separate constituents.

The packings most commonly used in chromatographic columns at the present time are activated carbon, alumina, silica gel, and, in the case of gas-liquid partition chromatography, a high boiling liquid disposed on a relatively inert carrier such as diatomaceous earth, ceramic beads or ceramic disks. The various liquids presently in use for this purpose include mineral oil, di-octyl phthalate, di-nonyl phthalate, silicone fluids, tri-cresyl phosphate, dibutyl phthalate, and the like. Either normally liquid or normally gaseous materials may be sampled and analyzed in either of the described forms of chromatography. In the event a liquid sample is involved it may be vaporized in the carrier stream and carried through the chromatographic column in this state.

In any of the above described forms of chromatography a sample mixture is percolated through the column with the objective of determining thereby the concentration of one or more of the components of the mixture. The flow rates of sample and elutant, if such is involved, are very slow and partly for this reason are difficult to regulate with sufficient accuracy that the elapsed time between introduction of the sample and emergence of a particular component from the column will be accurately reproduced from one analysis to the next. This is not necessarily serious in a laboratory instrument.

However, an important potential industrial application of chromatography is in the continuous monitoring or control of industrial processes. In this type of analysis a fluid stream, as for example a plant feed stream or an effluent stream, is continuously or intermittently sampled. The composition thereof with respect to one or more but generally less than all of the components is determined on a substantially continuous basis. In this type of operation a difference in the elapsed time between introduction of a sample and the emergence of components of interest from the column between successive intermittent analyses is a serious problem. However, I have found that this difficulty can be overcome by linking the timing device of the system, which may be the paper drive motor on a strip chart recorder, and means sensitive to flow rate of the fluid stream so that the timing device is responsive not to clock time but to volume of fluid passed through the column. With such an arrangement the relative rates of the strip chart of a recorder and the fluid flow are held constant, although neither one separately has to be held to close limits.

To this extent the invention contemplates a chromatograph comprising a chromatographic column, means for introducing a fluid sample into the column and causing it to flow therethrough, detector means for detecting variations in the characteristics of the effluent from the column, means for measuring the rate of flow of fluid in the column, sensing means for indicating the appearance of components of interest at the detector means, and means for varying the time scale of the sensing means responsive to and in proportion to variations in the rate of fluid flow.

The most conventional detector means in gas or gas-liquid partition chromatography is a thermal conductivity cell, the output of which may be coupled to a conventional strip chart recorder serving as the sensing means. In this case the paper drive motor on the recorder, as mentioned above, is driven at a variable rate controlled by the flow measuring device. In liquid chromatography the detecting means may be a photoelectric colorimeter or a refractometer. The flow measuring device may be a differential pressure gauge connected to the two ends of a viscosity tube, a photoelectric drop counter, or a float-type flow meter with photoelectric or electromagnetic sensing of the float position. Again the output of the colorimeter or refractometer may be connected to a strip chart recorder whose chart is driven responsive to variations in the detected flow rate.

Generally in process monitoring operation there is a certain previously selected composition which represents an optimum for the specific process involved; a mixture having such a composition may be referred to as a "standard" sample, although it is not necessary for the purpose of this invention that such sample exist in fact. In monitoring or controlling the process involved, it is important to detect deviations from this actual or hypothetical standard as quickly as possible so as to correct the process variables which are responsible for such deviation. By reason of the solution of the time variation problem by means of this invention, it is now possible to provide an internal computing circuit by means of which the detector signals resulting from the appearance of different components may be separately attenuated.

This separate attenuation makes it possible to upset the natural abundance ratios of the components merely by separate adjustment of the attenuation. Thus, the output signals resulting from abundant components may be attenuated sufficiently to bring all of the recorded peaks somewhere near the middle of the record scale and all of the peaks may be so adjusted that they will be equal for a sample having the "standard" composition.

If the peak heights for the components being monitored are established at equality, that equality is preserved independently of sensitivity changes of the chromatographic system due to temperature variations or other external causes. As a consequence any deviation of the several recorded peaks from equality will be a reliable indication of a change of the relative abundance of the particular mass or masses in the sample. Additionally, the magnitude of the change will be evidenced by the relative deviation of the peak from equality, and may be easily interpolated into deviations in sample composition by proportionate calculation.

The invention therefore also contemplates a chromatograph comprising a chromatographic column, means for introducing a fluid sample into the column and causing it to flow therethrough, detector means for receiving fluid emerging from the column and sensing the appearance of different components of the sample therein, a plurality of output channels adapted to carry the separate output signals developed at the detector responsive to different components of the sample, separate means in each channel for varying the signal carried in that channel, means for measuring the rate of fluid flow through the column, sensing means to sequentially sense signals carried in the several output channels, and means for varying the sensing speed and the rate of sequential sampling of the output channels responsive and in proportion to the measured rate of fluid flow.

Since the majority of chromatographic systems involve batch or dosing sample application, it is desirable and convenient to control the timing thereof conjointly with the control of recording speed, i. e. as a function of variations in fluid flow rate.

The invention will be clearly understood by the following description taken in conjunction with the accompanying drawing which is a schematic diagram of a gas phase chromatographic system involving the features of the invention.

The system includes a chromatographic column 10 charged with a suitable packing material 11. A supply of elutant gas (not shown) is connected to an inlet 12 for introduction of the elutant into the column 10. A sample dosing or sample introduction device 14 is likewise connected into the line 12 to introduce the sample on a dosing basis and by any well known conventional means, such as a constant-displacement intermittently operated piston pump or a valve.

The lower end of the column is connected by an effluent line 16 to a detector 17, which may conveniently be and, for purposes of this description, is assumed to be a thermal conductivity cell. A cell of this type characteristically develops a voltage signal proportional to the thermal conductivity of gas flowing therethrough which in turn is a function of the identity and concentration of sample components in the elutant gas. The effluent gas from the detector 17 passes through line 18 into a flow meter 19 and may thereafter be exhausted as indicated. The flow meter may take any conventional form as mentioned above. The entire operation is controlled by a programmer 20 which, in the drawing, is subdivided into sections 20A, 20B, 20C merely for the purpose of facilitating a description and understanding of its function. Timers or programmers of either mechanical or electronic construction are well known in the art. In this instance a mechanical programmer is illustrated and is conveniently the multiple cam type driven by a variable speed motor 22. In such application the entire sequence of operations is set up by proper development of suitable cams, the repetition rate of the sequence being a function of the speed at which the control cams are driven. This type of system is not unique to this invention and forms no part of the invention save for its function in the combination. A typical strip chart recorder is shown at 24 and includes a variable speed chart drive motor 25. The strip chart may be driven directly from motor 22, thereby eliminating motor 25 if desired.

The output of detector 17 is connected across a series of potentiometers 28, 29, 30 provided respectively with variable taps 28A, 29A, 30A, whereby the signals developed within the detector and applied across the potentiometers may be varied artificially before introduction into section 20A of the programmer. The number of potentiometers illustrated was chosen arbitrarily, it being apparent from the foregoing general description of the invention that a number is chosen corresponding to the number of components of the sample that are to be monitored.

To facilitate the continued description of the process, it is assumed that the output signal from the detector responsive to the appearance of component A will be attenuated at potentiometer 28, component B at potentiometer 29 and component C at potentiometer 30. If desired, a selector switch may be interposed between the detector and the several potentiometers for separately channeling the output of the detector through the several output channels. Such a switch is not necessary but, if used, may be driven by the programmer, and in which case the potentiometer taps may be connected directly to the recorder pen drive motor.

The attenuated signals are applied sequentially to the recorder 24, the timing thereof being the function of the programmer and in turn being controlled by the speed at which the variable speed motor 22 is driven, this in turn being a function of variations in the output of the flow meter 19. The electrical output of the flow meter is proportional to the rate of fluid flow therethrough, flow meters of this type and for this purpose being available commercially. The section 20A of the programmer controls the sequential application of the output voltages of potentiometer 28, 29 and 30 to the recorder 24. Section 20B of the programmer is connected to control the speed of the chart drive motor 25 as indicated so that the record will be time synchronized with fluid flow and the section 20C of the programmer is connected to control the sample inlet means 14, the overall result being a repetitive time reproducible monitoring of the sample stream connected to the sample control means 14. Power for the system may be applied to the programmer through line 32 from a source not shown.

It is to be understood that the separate attenuation of the detector output signals developed responsive to the appearance of differing components in the sample is a refinement of the invention and not a necessary adjunct to the interlock between fluid flow rate and process timing. The objective of rate reproduction accomplished by such interlock does not depend upon output attenuation for advantageous use in process monitoring.

I claim:

1. A chromatograph comprising a chromatographic column, means for passing a continuous stream of carrier fluid through the column, means for introducing a fluid sample into the carrier stream entering the column, detector means for receiving fluid emerging from the column and sensing the successive appearance of different components of the sample therein, a plurality of output channels adapted to carry the output signals developed at the detector responsive to different components of the sample, separate means in each channel for varying the signal carried in that channel, means for measuring the rate of fluid flow through the column, sensing means to sequentially sense signals carried in the several output channels, and means for varying the time scale of the sensing means and the rate of sequential sampling of output channels responsive and in proportion to the measured rate of fluid flow.

2. A chromatograph comprising a chromatographic column, means for passing a continuous stream of carrier fluid through the column, means for introducing a fluid sample into the carrier stream entering the column, detector means for receiving fluid emerging from the column and sensing the successive appearance of different components of the sample therein, a plurality of output channels adapted to carry the output signals developed at the detector responsive to different components of the sample, an adjustable tap potentiometer in each channel for varying the amplitude of signals carried in that channel, means for measuring the rate of fluid flow through the column, sensing means to sequentially sense signals carried in the several output channels, and means for varying the time scale of the sensing means and the rate of sequential sampling of the output channels responsive and in proportion to the measured rate of fluid flow.

3. A chromatograph comprising a chromatographic column, means for passing a continuous stream of carrier fluid through the column, means for introducing a fluid sample into the carrier stream entering the column, detector means for receiving fluid emerging from the column and sensing the successive appearance of different components of the sample therein, a plurality of output channels adapted to carry the output signals developed at the detector responsive to different components of the sample, separate means in each channel for varying the signal carried in that channel, means for measuring the rate of fluid flow through the column, sensing means to sequentially sense signals carried in the several output channels, a programmer for automatically controlling sample introduction, for controlling the time scale of the sensing means and for controlling the rate of sequential sampling of the output channels, and means for varying the cycling rate of the programmer responsive and in proportion to the measured rate of fluid flow.

4. Analytical apparatus comprising a chromatographic column for separating components of fluid mixtures, means for passing a continuous stream of carrier fluid through the column, means for introducing a sample fluid mixture into the carrier stream entering the column whereby the component fluids of the sample fluid mixture are separated in the column and appear successively in the effluent from the column, detector means sensitive to variations in the characteristics of the effluent from the column for detecting the appearance of successive fluid components in the effluent, means for recording the output of the detector means, and means responsive to the rate of fluid flow through the column, for varying the time scale of the recording means in accordance with variations in the rate of fluid flow through the column.

5. Analytical apparatus comprising a chromatographic column for separating components of fluid mixtures, means for passing a continuous stream of carrier fluid through the column, means for introducing a sample fluid mixture into the carrier stream entering the column whereby the component fluids of the sample fluid mixture are separated in the column and appear successively in the effluent from the column, detector means sensitive to variations in the characteristics of the effluent from the column for detecting the appearance of successive fluid components in the effluent, means for recording the output of the detector means, said recording means including a recording media and motor means driving the recording media, and means responsive to the rate of fluid flow through the column for varying the speed of the motor means in accordance with variations in the rate of fluid flow through the column.

6. Analytical apparatus comprising a chromatographic column for separating components of fluid mixtures, means for passing a continuous stream of carrier fluid through the column, means for introducing a sample fluid mixture into the carrier stream entering the column whereby the component fluids of the sample fluid mixture are separated in the column and appear successively in the effluent from the column, detector means sensitive to variations in the characteristics of the effluent from the column for detecting the appearance of successive fluid components in the effluent, means for recording the output of the detector means, a programmer for automatically controlling sample input and recording speed in accordance with a predetermined cycle, and means responsive to the rate of fluid flow through the column for varying the cycle rate of the programmer in accordance with variations in the rate of fluid flow through the column.

References Cited in the file of this patent

UNITED STATES PATENTS

| | | |
|---|---|---|
| 2,377,900 | Podbielniak | June 12, 1945 |
| 2,398,818 | Turner | Apr. 23, 1946 |
| 2,709,678 | Berger | May 31, 1955 |
| 2,813,010 | Hutchins | Nov. 12, 1957 |